(12) United States Patent
Sykes et al.

(10) Patent No.: US 6,920,976 B2
(45) Date of Patent: Jul. 26, 2005

(54) SECURITY FRAME

(75) Inventors: Philip K. Sykes, Shoreview, MN (US); Thomas Leo Mauren, Prior Lake, MN (US)

(73) Assignee: Mag, Inc., Martinsville, IN (US)

( * ) Notice: Subject to any disclaimer, the term of this patent is extended or adjusted under 35 U.S.C. 154(b) by 170 days.

(21) Appl. No.: 10/385,315

(22) Filed: Mar. 10, 2003

(65) Prior Publication Data

US 2004/0178092 A1 Sep. 16, 2004

(51) Int. Cl.[7] ............................................. B65D 85/57
(52) U.S. Cl. .................................................. 206/308.2
(58) Field of Search ...................... 206/1.5, 307, 308.2, 206/387.11, 701, 722, 724

(56) References Cited

U.S. PATENT DOCUMENTS

| | | | | |
|---|---|---|---|---|
| 4,052,867 A | * | 10/1977 | Faunce ............................. | 70/58 |
| 4,293,266 A | * | 10/1981 | St. Lawrence et al. ..... | 414/411 |
| 4,805,769 A | * | 2/1989 | Soltis et al. .............. | 206/308.2 |
| 4,865,190 A | * | 9/1989 | Gregerson et al. ........ | 206/308.2 |
| 4,881,645 A | * | 11/1989 | Smiler et al. ............. | 206/387.1 |
| 5,215,188 A | * | 6/1993 | Wittman ................... | 206/308.2 |
| 5,390,515 A | * | 2/1995 | Essick ............................ | 70/63 |
| 5,417,319 A | * | 5/1995 | Chalberg et al. ............. | 206/1.5 |
| 5,823,341 A | | 10/1998 | Nakasuji ................ | 206/387.11 |
| 5,934,114 A | * | 8/1999 | Weisburn et al. ............ | 70/57.1 |
| 6,102,200 A | | 8/2000 | Dressen et al. .......... | 206/308.2 |
| 6,321,905 B1 | * | 11/2001 | Sykes .......................... | 206/1.5 |
| 6,467,318 B1 | * | 10/2002 | Gattiker ...................... | 70/57.1 |

* cited by examiner

*Primary Examiner*—Kurt Fernstrom
(74) *Attorney, Agent, or Firm*—Nikolai & Mersereau, P.A.

(57) ABSTRACT

A security frame for enclosing DVD's or other articles for deterring tampering with the DVD's or removing the DVD's from the security frame. The security frame is thin such that it fits in the display racks for the DVD's and has a large open surface area on the front and back faces so a customer can see the packaging information on the DVD. The security frame can be removed at the store with a special key. The security frame is hinged for opening and closing and has tines, which overlap and lock the security frame together. The security frame is easy to close and lock by pressing the top frame member against the bottom frame member and easy to unlock and open with a key.

15 Claims, 3 Drawing Sheets

SECURITY FRAME

BACKGROUND OF THE INVENTION

1. Field of the Invention

This invention relates to security packages used in retail sales of DVD's and the like to deter tampering with or removal of the package and its contents.

2. Description of the Related Art

DVD's, CD's, computer games and like products are currently offered in packaging and then shrink wrapped to secure the contents against tampering in stores.

Unfortunately people have been entering stores, slitting or discarding the shrink wrap, then removing the media contents from the package and then replacing the empty package on shelf. When a customer later selects the product and does not notice the shrink wrap is slit or missing, they may purchase the item and take it home only to discover the media is missing from the package.

The stores are subsequently embarrassed when they learn from an irate customer that they have sold an empty DVD package and that store personnel failed to notice the package had been tampered with.

Store shelving displays for DVD's and like products are built to mirror the studio package size of the DVD's, resulting in the fact that there is not much additional room on the shelves for surrounding the DVD with a security package.

Current security packages, in addition to being much larger than the DVD product, are expensive. Existing security packages may also interfere with the visibility of DVD program the customer wants to read on the package.

Security packages frequently totally surround the DVD or other product using a substantial amount of expensive material designed to prevent any unauthorized access to the product.

Security packages need secure locking mechanisms, which prevent unauthorized opening by use of screwdrivers, pins or other tools. A security package with a unique locking mechanism, which needs a special key to open it, is desired.

SUMMARY OF THE INVENTION

The security frame deters tampering with the product contained in the frame and protects the shrink wrap from being slit open. The security frame is minimally larger than the studio package containing the media so that it fits easily in existing display racks in the stores, which are designed for the size of the DVD or other products contained in similar packaging. The security frame is also made thin, economically reducing the amount of material employed, thus lowering the cost of the security investment. Further, the security frame does not completely surround the product making it easier to read portions of the packaging thus allowing a complimentary reduction in the amount of material used.

The security frame material can be made of a clear see-through material to allow the customer to read the DVD program information without interference.

Since the security frame is thin and uses less material, and therefore the cost is reduced.

Since the security frame surrounds the opening flaps of DVD packages, it deters unauthorized removal of the media inside, reduces shoplifting and the associated returns resulting from customers' purchasing an empty package.

The security frame has an improved locking mechanism, which requires a special key to unlock the security frame at the store.

The security frame comprises a top and bottom member hinged on the back walls to easily open and close the security frame around the product to be protected. Opposing tines on the front walls of the top and bottom members engage to lock the security package in a closed position and can be opened with a key. The opposing tines have shelves, which overlap in the closed position to lock the security frame. The tines force each other apart by the force of closing the security frame and a key is used to force the tines in opposite directions to open the security frame. Angled portions on the tines help force the tines apart when closing the security package. Other angled portions on the tines engage the key when the key forces the tines apart to open the security frame. Apertures in the front wall or the top of the security frame allow access to the tines to open the security frame. A plurality of tine engaging positions on the key is needed to engage the tines all at the same time to open the security package thus deterring unauthorized opening of the security frame without a key.

The security frame is made out of a clear polycarbonate material. An electronic article surveillance tag is secured inside of the security frame in a position which is inaccessible to tampering and clearly visible through the clear polycarbonate material so as deter shop lifting.

OBJECTS OF THE INVENTION

It is an object of the invention to deter tampering with the package protecting a product to be sold.

It is an object of the invention to deter shoplifting.

It is an object of the invention to deter unauthorized removal of the product from the security frame by use of a material such as polycarbonate, which cannot easily be cut.

It is an object of the invention to prevent the cutting open of the security frame without destroying the security frame.

It is an object of the invention to reduce the costs of security packaging.

It is an object of the invention to reduce the amount of packaging material used for security packaging.

It is an object of the invention to provide a security package that can be removed at a store by using a key to open the security package.

It is an object of the invention to deter opening the package without a key, unless the security package contents are destroyed in the process.

It is an object of the invention to provide a security package, which is quickly and easily locked and unlocked.

It is an object of the invention to be adapted for automatic loading when in the open book position to stack the open security frame in a feeding machine and to place DCD's therein and to close and lock the security frame with automated equipment.

Other objects, advantages and novel features of the present invention will become apparent from the following detailed description of the invention when considered in conjunction with the accompanying drawing.

DESCRIPTION OF THE PREFERRED EMBODIMENTS

Figure 1:
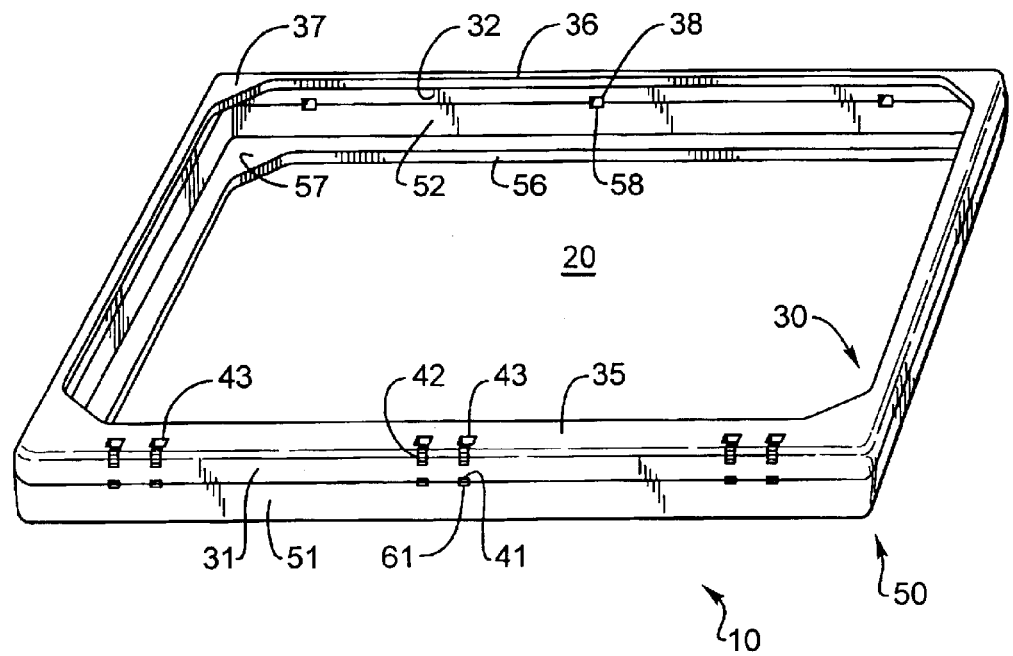
FIG. 1 is a perspective view of the security frame.

The security frame 10 is sized to fit a product such as a DVD 20, to be contained therein. The DVD 20 or other product can be placed inside the bottom half 50 of an open security frame 10, and then the top half 30 is pivoted on hinges 38, 58 on the top and bottom halves 30, 50 to close and lock the security frame 10 with the product inside.

The DVD 20, or other product, is visible inside the security frame 10 because it is unobstructed on its face so that labels can be clearly read. The Security frame 10 has relatively wide flanges 35, 55 to accommodate the locking mechanisms 40 and 60 on the front walls 31 and 51 of the top 30 and bottom 50 halves of the security frame 10. The security package has narrower flanges 36, 56 around the rest of the security package 10 to hold the DVD inside of the security package. The corners on the top 30 and bottom 50 halves of the security package 10 have extra flange surface area 37, 57 to prevent the DVD 20 from being removed from the security frame 10.

The security frame 10 has a top half 30 and a bottom half 50. The top half 30 has a front wall 31, a back wall 32, a right side wall 33 and a left side wall 34. The bottom half 50 has a front wall 51, a back wall 52, a right side wall 53 and a left side wall 54. The back walls 32 and 52 have hinges 38 and 58 respectively for hinging the top 30 and bottom 50 halves such that they can be opened and closed. Although hinge pieces 38 and 58 are shown in this embodiment however any means of providing a hinge such as a living hinge of plastic material along the adjoining back walls 32, 52 may be used.

The mating edge 39 of the walls 31, 32, 33, 34, of the bottom half 30 engage to mating edge 59 of the walls 51, 52, 53, 54 of the top half 50 to close the DVD 20 inside of the security package 10. The DVD package 20 is thus completely surrounded on its edges to prevent it from being opened and the contents removed.

In order to prevent the security frame 10 from being opened in an unauthorized manner the top half 30 and bottom half 50 have locking members 40 and 60 respectively which engage to lock the halves 30, 50 together.

Figure 2:
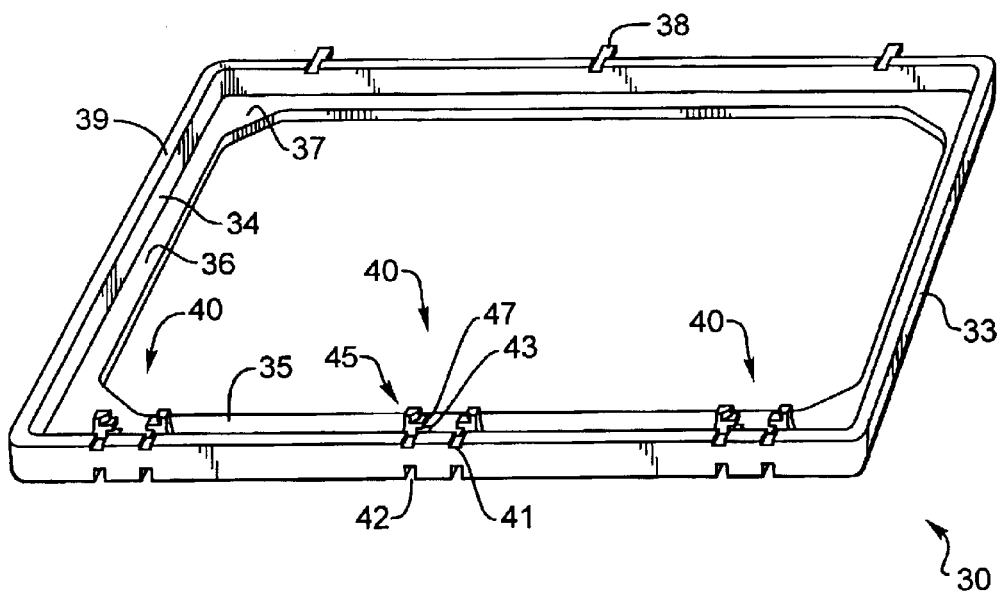
FIG. 2 is a perspective view of the top of the security frame showing the male locking members.
Figure 4:
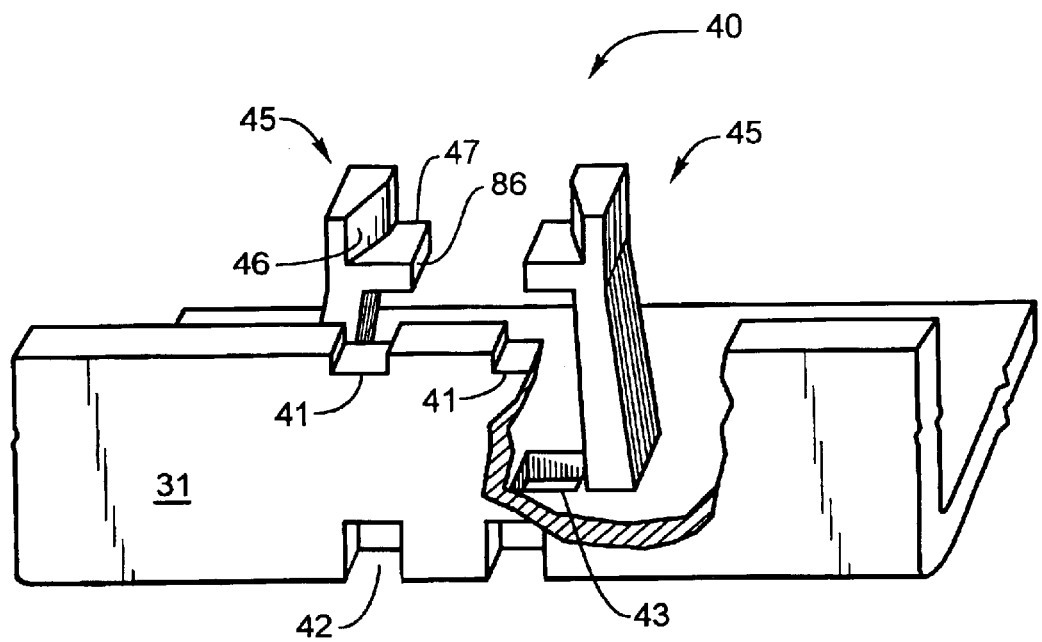
FIG. 4 is a perspective of the male locking members.

Locking members 40 on top half 30 of security frame 10 has two opposing tines 45 attached to flange 35 and in close proximity to front wall 31 as best viewed in FIGS. 2 and 4. The tines 45 are angled toward each other and have an angled portion 46 on one side near the top. Just below the angled portion 46 is a shelf portion 47. The front wall 31 has apertures 41 and 42 aligned with the tines 45. The flange 35 has apertures 43 adjacent tine 45.

Figure 3:
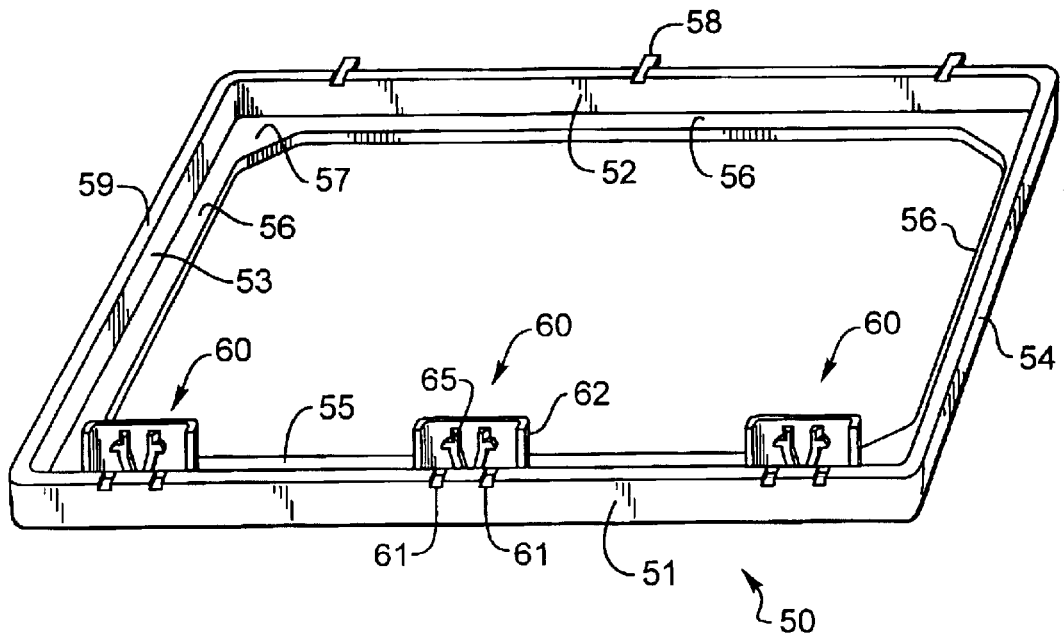
FIG. 3 is a perspective view of the bottom of the security frame showing the female locking members.
Figure 5:
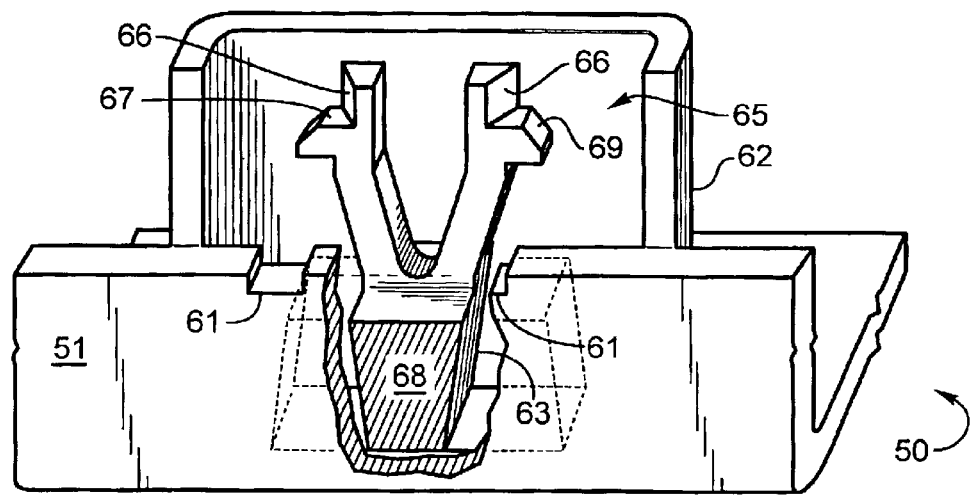
FIG. 5 is a perspective of the female locking members.

Locking members 60 on the bottom half 50 of security frame 10 has a shield 62 attached to wall 61 and extending above the top edge 59 of wall 51 on three sides and surrounding a Y shaped tine member 65 which also extends above the top edge 59 of wall 61. As best seen in FIGS. 3 and 5 the Y shaped tine members 65 have a tine wall connection portion 68 extending between the front wall 61 and the shield 62 at the base of the tine member 65. A post 63 forms the base of the of the Y shaped tine member 65 which then branches into two portions having angled top portions 66 and shelf portions 67. The wall 51 has apertures 61, which align with apertures 41 on wall 31 to form a large aperture as shown in FIG. 1.

Figure 6:
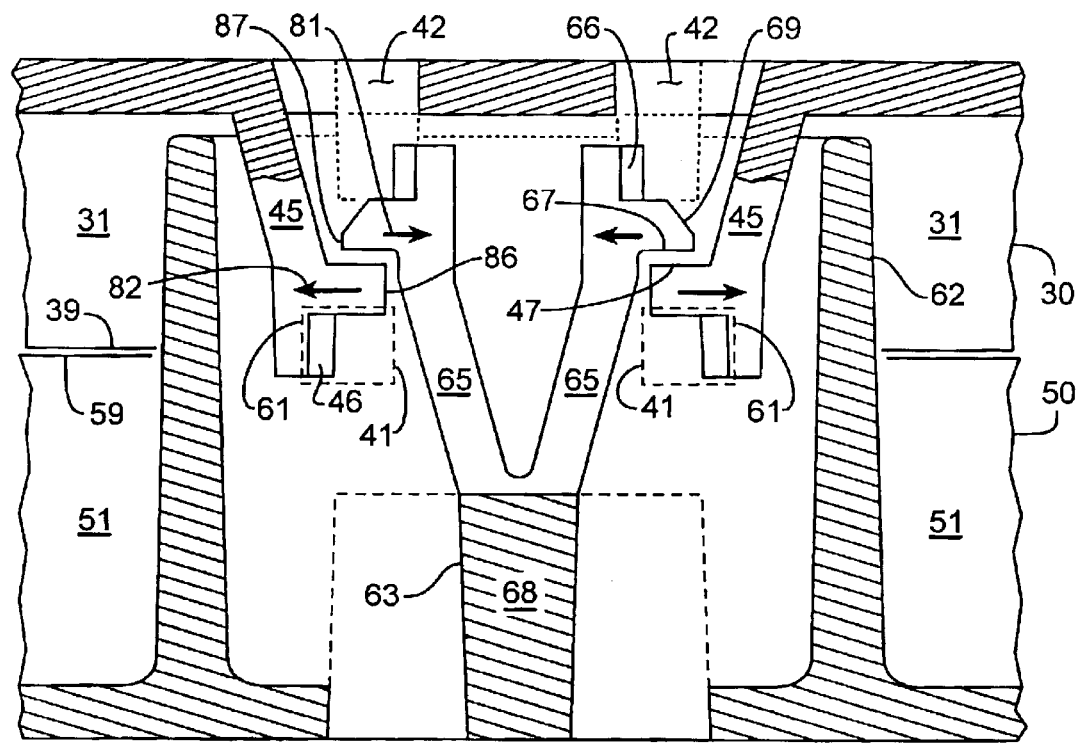
FIG. 6 is a side schematic view of a locked the security frame.

When the top half of the security frame 30 is closed against the bottom half of the security frame 50 the locking members 40 and 50 engage and lock as best seen in FIG. 6. In the locked position the shelf 47 on tines 45 and the shelf 67 on tines 65 opposingly engage preventing the opening of the security frame 10. In the locked position the shield 62 protects the back and side portions of the tines 45 and 65 from tampering and the front walls 31 and 51 protect the front portions of the tines 45 and 65 from tampering.

To lock the security frame 10 the tines 65 engage tines 45 on angled portion 69 thus pushing tines 65 together as shown by arrows 81 and spreading tines 45 apart as shown by arrows 82 allowing the tines 45, 65 to spread apart relative to each other with surfaces 86, 87 touching, until they can pass each other vertically and then snap into the locked position.

A key, not shown, inserted into the apertures 41, 61 push on the angled portion 46 of tine 45 to move the tine in direction 82 while simultaneously the key also enters aperture 42 to engage angled portion 66 moving tine 65 in direction 81 until the tines 45 and 65 no longer have shelves 47 and 67 opposed thus allowing the opening security frame 10.

In another embodiment a key may act through aperture 43 to engage the angled portion 69 on tine 65 to move it in direction 81 to disengage the tines. The key may act though aperture 43 in combination with a key entering through aperture 42 or separately.

By having two sets of tines, which must be moved to disengage the tines it makes it harder for the security frame 10 to be opened without a key.

The embodiment shown has 3 sets of locking member pairs 40 and 60 however any number of pairs of locking members may be used. Another embodiment may have one pair of locking members 40, 60 in the middle of the front of the security frame 10. Still another embodiment may have two pairs of locking members 40, 60 one pair at each corner on the front of the security frame 10. In still other embodiments the locking members can be on the sides of the security package on or the front and sides.

The security frame can be made from a clear polycarbonate or other materials which have properties as shown above.

The security frame 10 can have an electronic article surveillance tag secured inside of it in a clearly visible position inside the clear security frame 10 so as to deter shoplifting attempts.

The open book style security frame 10 with the top half 30 and bottom half 50 opened is stackable in a packaging feeding machine so that a product such as a DVD can be added to the security frame 10 and the security frame 10 closed by pivoting the top half 30 on the hinges 38, 58 until the security frame is closed and locked. The product can thus be automatically packaged in the security frame.

When the security frame is made out of a clear polycarbonate material it can not be cut open without destroying the package enclosed in the security frame. A key must therefore be used to release the DVD from the security frame.

Obviously, many modifications and variations of the present invention are possible in light of the above teachings. It is therefore to be understood that, within the scope of the appended claims, the invention may be practiced otherwise than as specifically described.

What is claimed is:

1. A security frame comprising:
   a top frame member having a front wall, a back wall, a left wall, and a right wall, the back side having hinge members attached to the back wall, the front wall, right wall, back wall, and left wall each having a flange, the flanges being on the top of the walls to form a partial top surface for the top frame member, the walls having a mating bottom edge on the end of the walls opposite the flanges, a bottom frame member having a front wall, a back wall, a left wall and a right wall, the back side having hinge members attached thereto, the front wall, right wall, back wall and left wall each having a flange, the flanges being on the bottom of the wall to form a partial bottom surface for the bottom frame member, the walls having a mating bottom edge on the opposite end of the wall from the flanges, such that the hinge members of the top and bottom frame members are joined so that the top frame member and the bottom frame member pivot relative to each other, and close such that the top mating edges are adjacent the bottom mating edges, the top member front wall flange having a pair of tines parallel to the front wall, and extending toward the mating bottom edge, each tine having a shelf extending from the tine facing the other tine, the tines extending approximately to the top of the front wall edge, the bottom member front wall flange having a Y shaped tine with two branches, each tine having a shelf facing outward away from the other tine, the tines extending between the tines of the top member and beyond the bottom mating edge of the bottom wall, such that the tines on the top member and the bottom member have overlapping shelves which engage and lock the top member to the bottom member when the mating edges of the top and bottom walls are proximate each other.

2. A security frame as in claim 1 wherein, the shelves on the tines of the bottom frame member have an angled portion for engaging the shelves on the tines on the top frame member and pushing apart the top frame member tines apart and pushing the bottom frame member tines together as the top frame member is pivoted into a closed position against the bottom frame member until the shelves on the top and bottom frame members pass each other and extend into their locked positions.

3. A security frame as in claim 2 wherein, apertures in the front wail of the top frame member and apertures in the front wall of the bottom frame member allow a key inside of the security frame to engage the tines on the top from member and the bottom frame member to push the tines on opposite directions such that the shelves on the tines are disengaged and the security frame can be opened.

4. A security frame as in claim 2 wherein, a key engaging angled portion on the tines of the top frame member and a key engaging angled portion on the tines of the bottom frame member for engaging a key to push the tines apart so that the security package can be opened.

5. A security frame as in claim 1 wherein, a shield attached to the front wall and flange of the front wall extends around the Y shaped tines of the bottom frame member.

6. A security frame as in claim 3 wherein, an aperture in the front wall flange of the top frame member adjacent the tines thereon such that a key inserted through the apertures can engage the tines on the bottom frame member when the security frame is closed to push the tines together to open the security package.

7. A security frame as in claim 3 wherein, a flange extension in the corners of the walls of the top and bottom frame members adds extra material in the corners to help prevent an item from being extracted from the security frame.

8. A security frame as in claim 3 wherein, apertures in the flange on the front wall of the top frame member adjacent the tines thereon such that a key inserted through the apertures can engage the tines on the bottom frame member when the security frame is closed to push the tines together to open the security package.

9. A security frame as in claim 3 wherein, a key engaging angled portion on the tines of the top frame member and a key engaging angled portion on the tines of the bottom frame member for engaging a key to push the tines apart so that the security package can be opened.

10. A security frame as in claim 4 wherein, a shield attached to the front wall and flange of the front wall extends around the Y shaped tines of the bottom frame member.

11. A security frame as in claim 3 wherein, a key engaging angled portion on the tines of the top frame member and a key engaging angled portion on the tines of the bottom frame member for engaging a key to push the tines apart so that the security package can be opened.

12. A security frame as in claim 11 wherein, a shield attached to the front wall and flange of the front wall extends around the Y shaped tines of the bottom frame member.

13. A security frame as in claim 12 wherein, an aperture in the front wall flange of the top frame member adjacent the tines thereon such that a key inserted through the apertures can engage the tines on the bottom frame member when the security frame is closed to push the tines together to open the security package.

14. A security frame as in claim 13 wherein, a flange extension in the corners of the walls of the top and bottom frame members adds extra material in the corners to help prevent an item from being extracted from the security frame.

15. A security frame as in claim 14 wherein, apertures in the flange on the front wall of the top frame member adjacent the tines thereon such that a key inserted through the apertures can engage the tines on the bottom frame member when the security frame is closed to push the tines together to open the security package.

* * * * *